Figure 1:
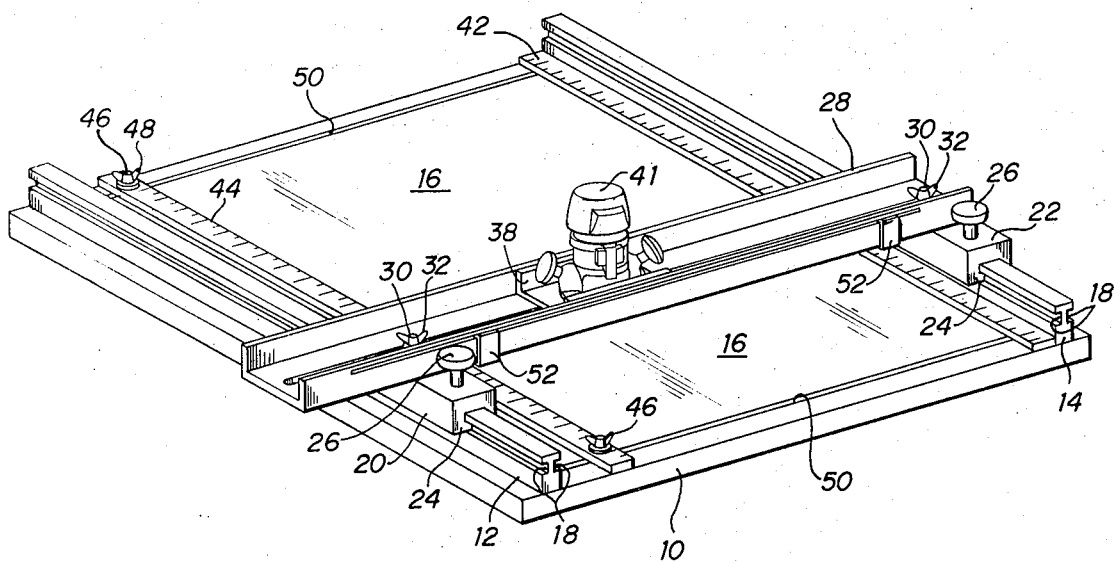

United States Patent [19]
Markham

[11] 3,827,468
[45] Aug. 6, 1974

[54] ROUTING GUIDE
[76] Inventor: Orvil A. Markham, 9060 Jared, Dallas, Tex. 75217
[22] Filed: May 23, 1973
[21] Appl. No.: 363,001

[52] U.S. Cl............. 144/136 R, 33/32 C, 33/76 R
[51] Int. Cl............................ B27c 5/04, B431 7/00
[58] Field of Search...... 33/32 R, 32 B, 32 C, 32 D, 33/32 E, 32 G, 75, 26, 76, 80, 100; 144/253, 134, 136

[56] References Cited
UNITED STATES PATENTS

| | | | |
|---|---|---|---|
| 977,829 | 12/1910 | Ourdan | 33/32 C |
| 984,347 | 2/1911 | Cardell | 33/26 |
| 1,109,755 | 2/1914 | Hunter | 144/136 B |
| 2,580,263 | 12/1951 | Wooten | 33/32 C |
| 2,848,923 | 8/1958 | Diefenbach | 33/76 |
| 3,127,680 | 4/1964 | Brichard et al. | 33/32 C |

Primary Examiner—Louis R. Prince
Assistant Examiner—John W. Shepperd
Attorney, Agent, or Firm—Richards, Harris & Medlock

[57] ABSTRACT

A routing guide having a base with tracks on either side thereof for receiving a workpiece therebetween; a slotted guide member extends between the tracks over the base, and has carriage means slidably engaging each track for movement of the guide member along the tracks; a mounting plate is received over the slot of the guide member so that a portable cutting tool such as a router may be carried thereon so that the bit of the tool extends through the hole in the mounting plate and the slot on the guide member to be traversable across the workpiece placed on the base; the guide member is pivotally mounted on each of its ends so that it may be rotated with respect to the tracks for making angular cuts.

6 Claims, 2 Drawing Figures

PATENTED AUG 6 1974  3,827,468

ROUTING GUIDE

This invention relates to guides for performing selected cuts on workpieces, and more particularly for a guide suitable for use with portable tools such as a router for performing operations such as routing, dadoing, mitering, squaring or other cutting or grooving operations.

In various shop operations, particularly in the woodworking area as it pertains to preparation of cabinets, it is often desired to utilize portable tools such as routers or saws to perform routing, cutting or grooving operations in the surface of a workpiece.

The present invention is directed to a novel and improved structure for implementing and simplifying the task of accurately utilizing such tools in performing these operations. In may be utilized in connection with routing, dadoing, sculpturing, grooving or otherwise performing cuts in the surfaces of a workpiece, and also in sawing or cutting workpieces to square or at selected angles such as in mitering. While it is particularly well adapted to use with a portable router, and it is described herein in connection with such use, it will be understood that other types of cutting tools may be advantageously used with the invention.

The use of the device of the present invention assists in promoting safe and efficient use of such tools in these operations. Moreover, the present invention is directed to a device which will permit an accurate preselection of settings for performing these operations which may be utilized repetitively to produce duplicate workpieces, and which may be readily and accurately adjusted to change the angle or location of cuts.

In accordance with the invention, there is provided a routing guide having a base for receiving a workpiece and a pair of straight parallel longitudinally extending tracks spaced apart on the base to define an area for receiving the workpiece therebetween. At least one elongate slotted guide member extends between the tracks above the base traversing the area for receiving the workpiece and having carriage means for slidably engaging each of the tracks for movement of the guide member along the tracks. A mounting plate is slidably received by the guide member, the plate being adapted to receiving a cutting device, and having a hole for receiving the bit which is registered with the slot of the guide member, so that the bit may be passed across a workpiece performing the cutting operation by moving the mounting plate along the guide member with the bit extending down through the mounting plate and guide member. Calibration means are associated with each track to provide visible indications of location along each track.

In a further aspect of the invention, fastening means are provided for securing each end of the guide member in a selected position with respect to each track. Means are further provided to prevent pivoting of the guide member with respect to the tracks so that angular cuts can be made.

Figure 2:
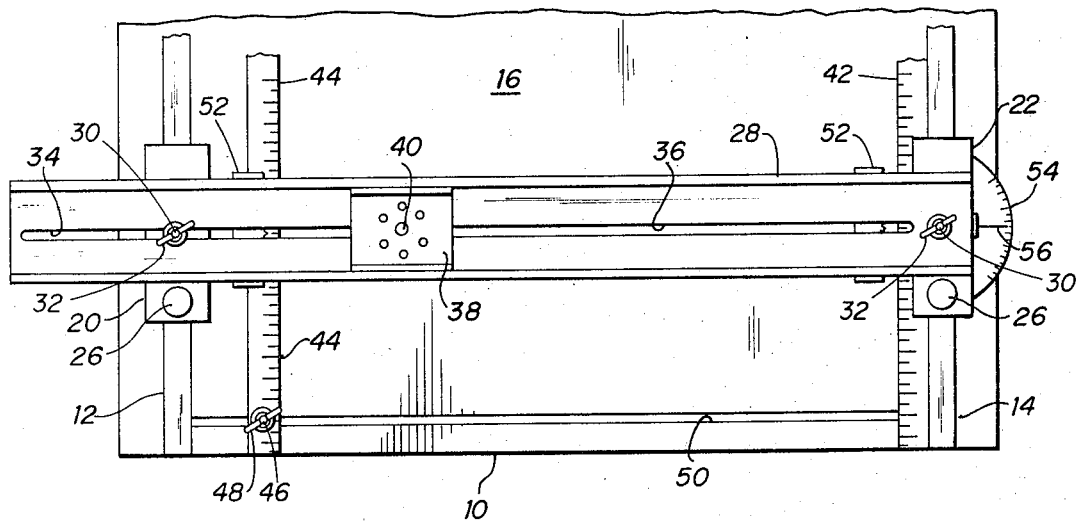

For a more complete understanding of the present invention and for further objects and advantages thereof, reference may now be had to the following description taken in conjunction with the accompanying drawings, in which:

FIG. 1 is a perspective view of a routing guide embodying the present invention; and FIG. 2 is a plan view of the device shown in FIG. 1, with the portable tool removed.

The device illustrated has a flat base 10 at opposite edges of which are mounted tracks 12 and 14. Central area 16 of base 10 between the tracks 12 and 14 is adapted to receive a flat workpiece. Tracks 12 and 14 are provided with grooves 18 on opposite sides thereof for slidably receiving carriages 20 and 22, respectively. Carriages 20 have downwardly extending legs 24 which surround the upper portions of tracks 12 and 14 and extend inwardly to engage grooves 18 of the tracks 12 and 14. The fit of carriages 20 and 22 with the tracks 12 and 14 is sufficiently close to prevent undue play between them, while still permitting free sliding movement of the carriages 20 and 22 on the tracks 12 and 14.

Tightening screws 26 are provided on carriages 20 and 22 and are adapted to being tightened down to bear against the upper surfaces of tracks 12 and 14 so as to secure the carriages 20 and 22 in selected positions on tracks 12 and 14.

A guide member 28 extends between tracks 12 and 14 over the workpiece area 16. Guide member 28 is adjustably secured in selected angular positions with respect to carriages 20 and 22 by means of a threaded fastener 30 extending upwardly through the carriages 20 and 22 and the guide member 28. A wing nut 32 engages each of the fasteners 30. A slot 34 is provided in guide member 28 at the area in which fastener 30 extends through it, to permit guide member 28 to be rotated at an angle with respect to tracks 12 and 14 and carriages 20 and 22. Slot 34 is extended across the length of guide member 28 so that it traverses the entire width of the area 16. The cutter receiving portion 36 of slot 34 overlying area 16 has a width greater than that of the cutting instruments which are to be used with the device. A slidable mounting plate 38 which is U-shaped and which has a central aperture 40 is mounted in sliding relationship with guide member 28. The aperture 40 registers with slot 34 so that the mounting plate may receive a cutting tool 41 thereon with the cutting instrument extending downwardly through aperture 40 and slot 34 over the area 16 for receiving the workpiece.

A fixed calibrated rule 42 is provided adjacent track 14 and is inscribed with desired units for indicating location along track 14. A similar calibrated rule 44 is provided to be associated with the opposite track 12. Rule 44 may be adjusted for the width of the workpiece as it is secured to the base 10 by means of threaded fastening means 46 and wing nuts 48 extending through slots 50 which traverse ends of the base 10. Indicators 52 are mounted on guide member 28 having a pointer visible when viewed downwardly through slot 34, so that the location of guide member 28 along the tracks is indicated.

A protractor 54 on carriage 22 cooperates with a pointer 56 mounted on the end of guide member 28 for indicating the angular relationship of the guide member 28 with respect to tracks 12 and 14.

Spacers (not shown) may be provided between guide member 28 and the respective carriages 20 and 22 for adjusting the height of guide member 28 to accomodate workpieces of various thicknesses. Moreover, if a number of cuts are desired to be made on the same workpiece, these cuts are to be repetitively performed on successive workpieces, a number of guide members constructed similarly to the one shown and utilizing the same type of carriage arrangement may be mounted simultaneously on tracks 12 and 14 so that all of the cuts desired may be made without resetting.

In operation, the guide member 28 is set for the desired cuts to be made by sliding carriages 20 and 22 along tracks 12 and 14 to the desired positions utilizing calibrated rules 44 and 42, and if angle cuts are desired, protractor 54 for ascertaining the correct positions. Once the guide member or guide members are established in the correct position, the workpiece may be inserted in the area 16 and the cutting operation performed. It iwll be appreciated that one adjustment will suffice for making an entire series of operations on repetitive workpieces. Moreover, it will be appreciated that the adjustments provided by this device are extremely versatile while still being very simple to use, and being embodied in a device which is compact and relatively inexpensive to produce. While the invention has been described particularly with routing operations, other areas with which a device of this type may be utilized are equally contemplated by this invention.

Although a preferred embodiment of the invention has been described in detail, it is to be understood that various changes, substitutions and alterations can be made therein without departing from the spirit and scope of the invention as defined by the appended claims.

What is claimed is:

1. A guide device for portable routers comprising:
   a base for receiving a workpiece;
   a pair of straight parallel longitudinally extending tracks spaced apart on said base defining an area to receive a workpiece therebetween;
   at least one elongate slotted guide member for removably receiving a portable router, the guide member extending between the tracks above the base traversing the area for receiving the workpiece, and having a substantially flat and unobstructed surface adjacent both sides of its slot along the length of the guide member which traverses the area for receiving the workpiece, such flat surface being of sufficient width to receive and support a portable router, and the slot of the guide member having a width to receive the bit of a router whereby a router may be placed in position to operate on a workpiece positioned on said base by placing it atop said guide member for sliding movement up and down the guide members with its bit extending through the slot, and may be removed from such operative position by lifting it from the guide member;
   a carriage on each track, each carriage being rotatably secured to the guide member, and each carriage being slidably engaged with its respective tracks, whereby the guide member may be situated at selected locations and angular dispositions with respect to the tracks;
   locking means for securing the carriages and guide member in fixed position during operations; and
   calibrated indicator means associated with each track whereby providing visible indications or location along each track.

2. The device of claim 1, further comprising downward facing surfaces on the track and horizontally extending portions on each said carriage engaging the downward facing surfaces of said tracks to secure each carriage in sliding engagement with its respective track.

3. The device of claim 1, in which the guide member is characterized by a channel cross-section, so that upstanding flanges are provided along the edges of the guide member for receiving a router therebetween.

4. A portable router and guide comprising:
   a base for receiving a workpiece;
   a pair of straight parallel longitudinally extending tracks spaced apart on said base defining an area to receive a workpiece therebetween;
   at least one elongate slotted guide member for removably receiving a portable router, the guide member extending between the tracks above the base traversing the area for receiving the workpiece, and having a substantially flat and unobstructed surface adjacent both sides of its slot along the length of the guide member which traverses the area for receiving the workpiece, such flat surface being of sufficient width to receive and support a portable router, and the slot of the guide member having a width to receive the bit of a router whereby a router may be placed in position to operate on a workpiece positioned on said base by placing it atop said guide member for sliding movement up and down the guide members with its bit extending through the slot, and may be removed from such operative position by lifting it from the guide member;
   a portable router removably positioned over the guide member with its bit extending downwardly through the guide member slot;
   a carriage on each track, each carriage being rotatably secured to the guide member, and each carriage being slidably engaged with its respective tracks, whereby the guide member may be situated at selected locations and angular dispositions with respect to the tracks;
   locking means for securing the carriages and guide member in fixed position during operations; and
   calibrated indicator means associated with each track whereby providing visible indications of location along each track.

5. The device of claim 4, further comprising downward facing surfaces on the track and horizontally extending portions on each said carriage engaging the downward facing surfaces of said tracks to secure each carriage in sliding engagement with its respective track.

6. The device of claim 4, in which the guide member is characterized by a channel cross-section, so that upstanding flanges are provided along the edges of the guide member for receiving a router therebetween.

* * * * *